United States Patent
Mehra et al.

(10) Patent No.: US 9,882,815 B2
(45) Date of Patent: Jan. 30, 2018

(54) ADAPTIVE LOAD BALANCING IN PACKET PROCESSING

(71) Applicant: Telefonaktiebolaget L M Ericsson (publ), Stockholm (SE)

(72) Inventors: Ashwani Kumar Mehra, Bangalore (IN); Prashant Anand, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 205 days.

(21) Appl. No.: 14/579,722

(22) Filed: Dec. 22, 2014

(65) Prior Publication Data

US 2016/0182379 A1   Jun. 23, 2016

(51) Int. Cl.
*H04L 12/803* (2013.01)
*H04L 12/741* (2013.01)
*H04L 12/743* (2013.01)

(52) U.S. Cl.
CPC ............ H04L 47/125 (2013.01); H04L 45/74 (2013.01); H04L 45/7453 (2013.01)

(58) Field of Classification Search
CPC .... H04L 47/125; H04L 45/74; H04L 45/7453
USPC ........................................................ 709/223
See application file for complete search history.

(56) References Cited

U.S. PATENT DOCUMENTS

| | | | |
|---|---|---|---|
| 7,565,651 B1 | 7/2009 | Carey | |
| 8,144,587 B2* | 3/2012 | Heinz | H04L 12/5695 370/235 |
| 9,450,881 B2* | 9/2016 | Dumitrescu | H04L 47/623 |
| 2005/0041595 A1* | 2/2005 | Uzun | H04L 12/42 370/252 |

(Continued)

FOREIGN PATENT DOCUMENTS

| | | |
|---|---|---|
| EP | 2 819 009 A2 | 12/2014 |
| GB | 2 505 051 A | 2/2014 |

OTHER PUBLICATIONS

Estan, et al., "New Directions in Trac Measurement and Accounting: Focusing on the Elephants, Ignoring the Mice", ACM Transactions on Computer Systems, vol. 21, No. 3, Aug. 2003, pp. 270-313.

(Continued)

*Primary Examiner* — Kevin Bates
*Assistant Examiner* — Nazia Naoreen
(74) *Attorney, Agent, or Firm* — Nicholson De Vos Webster & Elliott LLP

(57) ABSTRACT

A method for forwarding packets in a network device is disclosed. The method comprises receiving a packet; mapping the packet to a bucket, where the bucket is associated with a packet processing thread from a plurality of packet processing threads; and determining whether the packet processing thread is oversubscribed. The method continues with, in response to determining that the packet processing thread is not oversubscribed, mapping the packet to the packet processing thread; and in response to determining that the packet processing thread is oversubscribed, the method comprises distributing the packet to one of the plurality of packet processing threads based on a predefined load balancing scheme, processing the packet in the one of the plurality of packet processing threads, and forwarding the packet according to a predetermined order, where the predetermined order is based on a position of the packet relative to other packets at their receipt.

16 Claims, 7 Drawing Sheets

(56) References Cited

U.S. PATENT DOCUMENTS

| | | | |
|---|---|---|---|
| 2006/0187965 A1* | 8/2006 | Lee | H04L 1/0061 370/474 |
| 2007/0136311 A1 | 6/2007 | Kasten et al. | |
| 2008/0198746 A1 | 8/2008 | Kwan et al. | |
| 2010/0157800 A1 | 6/2010 | Liu et al. | |
| 2011/0116443 A1 | 5/2011 | Yu et al. | |
| 2013/0185378 A1 | 7/2013 | Giacomoni et al. | |
| 2013/0188494 A1 | 7/2013 | Mekkattuparamban et al. | |
| 2013/0347005 A1 | 12/2013 | Lam et al. | |
| 2016/0173338 A1 | 6/2016 | Wolting | |

OTHER PUBLICATIONS

Guoyu Ou et al., "DM-Midware: A Middleware to Enable High Performance Data Mining in Heterogeneous Cloud", 2013 IEEE/WIC/ACM International Conferences on Web Intelligence (WI) and Intelligent Agent Technology (IAT), IEEE Computer Society, vol. 3, Nov. 17, 2013, pp. 70-73.

J. Postel, "User Datagram Protocol," Aug. 28, 1980, 3 pages, RFC: 768.

"Transmission Control Protocol, DARPA Internet Program Protocol Specification," Sep. 1981, 91 pages, RFC: 793, Information Sciences Institute, University of Southern California, Marina del Rey, California.

C. Hedrick, "Routing Information Protocol," Jun. 1988, 33 pages, Network Working Group, Request for Comments: 1058.

David Oran, "OSI IS-IS Intra-domain Routing Protocol," Feb. 1990, 157 pages, Network Working Group, Request for Comments: 1142.

T. Socolofsky, et al., "A TCP/IP Tutorial," Jan. 1991, 28 pages, Network Working Group, Request for Comments: 1180.

G. Malkin, et al., "RIPng for IPv6," Jan. 1997, 19 pages, Network Working Group, Request for Comments: 2080.

R. Braden, et al., "Resource ReSerVation Protocol (RSVP)—Version 1 Functional Specification," Sep. 1997, 112 pages, Network Working Group, Request for Comments: 2205.

J. Wroclawski, "The Use of RSVP with IETF Integrated Services," Sep. 1997, 33 pages, Network Working Group, Request for Comments: 2210.

J. Wroclawski, "Specification of the Controlled-Load Network Element Service," Sep. 1997, 19 pages, Network Working Group, Request for Comments: 2211.

S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.

G. Malkin, "RIP Version 2," Nov. 1998, 39 pages, Network Working Group, Request for Comments: 2453, The Internet Society.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

D. Thaler, et al., "Multipath Issues in Unicast and Multicast Next-Hop Selection," Nov. 2000, 9 pages, Network Working Group, Request for Comments: 2991, The Internet Society.

C. Hopps, "Analysis of an Equal-Cost Multi-Path Algorithm," Nov. 2000, 8 pages, Network Working Group, Request for Comments: 2992, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

D. Awduche, et al., "RSVP-TE: Extensions to RSVP for LSP Tunnels," Dec. 2001, 61 pages, Network Working Group, Request for Comments: 3209, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffsery Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.

L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

K. Kompella, et al., "Procedures for Modifying the Resource reSerVation Protocol (RSVP)," Oct. 2004, 7 pages, Network Working Group, Request for Comments: 3936, The Internet Society.

B. Fenner, et al., "Management Information Base for the User Datagram Protocol (UDP)," Jun. 2005, 19 pages, Network Working Group, Request for Comments: 4113, The Internet Society.

Y. Rekhter, et al., "A Border Gateway Protocol 4 (BGP-4)," Jan. 2006, 104 pages, Network Working Group, Request for Comments: 4271, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffServ Service Classes," Aug. 2006, 57 pages, Network Working Group, Request for Comments: 4594, The Internet Society.

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

(56) References Cited

OTHER PUBLICATIONS

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Andersson, et al., "LDP Specification," Oct. 2007, 135 pages, Network Working Group, Request for Comments: 5036, The IETF Trust.
R. Coltun, et al., "OSPF for IPv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
Sally Floyd and Van Jacobson, "Random Early Detection Gateways for Congestion Avoidance," IEEE/ACM Transactions on Networking, vol. 1, No. 1, Aug. 1993, 22 pages.
"Network Functions Virtualisation, Introductory White Paper," Issue 1, Oct. 22-24, 2012 at the SDN and OpenFlow World Congress, Darmstadt-Germany, 16 pages.

\* cited by examiner

ADAPTIVE LOAD BALANCING IN PACKET PROCESSING

FIELD

Embodiments of the invention relate to the field of networking; and more specifically, to the adaptive load balancing of packets in a packet processing system.

BACKGROUND

Network functions virtualization (NFV) is a network architecture concept that implements specific functions or entire classes of network device functions as building blocks that may be connected, or chained, together to create communication services. These functions are implemented in a virtualized software environment that enables their distribution to and execution on commodity hardware deployed within a network.

NFV relies upon, but differs from, traditional server virtualization techniques such as those used in enterprise level software. A virtualized network function, or VNF, may be implemented via one or more virtual machines running different software and processes, on top of standard network device or server architectures, such as switches and storage systems, or even in a cloud computing infrastructure, instead of having custom hardware appliances for each network function.

A VNF may be implemented to perform packet processing and forwarding of Layer 2, Layer 2.5 or Layer 3 traffic and may be referred to as a Forwarding VNF. Packets received at a network element implementing a forwarding VNF are distributed to packet processing threads performing the forwarding task. The packet processing threads may use a run-to-completion model, where each thread runs an instance of a forwarding software (e.g., Ingress/Egress or Collapsed Ingress/Egress functionality). Various approaches may be used to distribute packets to the packet processing threads.

SUMMARY

A method for forwarding packets in a network device is disclosed. The method comprises receiving a packet; mapping the packet to a bucket, where the bucket is associated with a packet processing thread from a plurality of packet processing threads. The method continues with determining whether the packet processing thread is oversubscribed. The method continues with, in response to determining that the packet processing thread is not oversubscribed, mapping the packet to the packet processing thread; and in response to determining that the packet processing thread is oversubscribed, the method comprises distributing the packet to one of the plurality of packet processing threads based on a predefined load balancing scheme, processing the packet in the one of the plurality of packet processing threads, and forwarding the packet according to a predetermined order, where the predetermined order is based on a position of the packet relative to other packets at their receipt in the network device.

A non-transitory machine-readable storage medium for implementing packet forwarding in a network device is disclosed. The non-transitory machine-readable medium has instructions stored therein, which when executed by a processor, cause the processor to perform operations in a network device. The operations comprise receiving a packet; mapping the packet to a bucket, where the bucket is associated with a packet processing thread from a plurality of packet processing threads; determining whether the packet processing thread is oversubscribed; responsive to determining that the packet processing thread is not oversubscribed, mapping the packet to the packet processing thread; and responsive to determining that the packet processing thread is oversubscribed, distributing the packet to one of the plurality of packet processing threads based on a predefined load balancing scheme, processing the packet in the one of the plurality of packet processing threads, and forwarding the packet according to a predetermined order, wherein the predetermined order is based on a position of the packet relative to other packets at their receipt in the network device.

The embodiments of the disclosed techniques provide an adaptive packet processing mechanism that aims to provide high performance packet processing by selecting between a direct flow mapping and load balancing mapping for each flow received depending on the state of the packet processing threads forwarding the packets. The embodiments of the disclosed techniques allow for a portion of the flows to be processed according to a direct mapping (flow-thread), avoiding the cost of reordering for that portion of the flows. The embodiments of the disclosed techniques further allow load balancing flows only when needed. Thus, the adaptive packet processing re-orders the packets only when needed.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
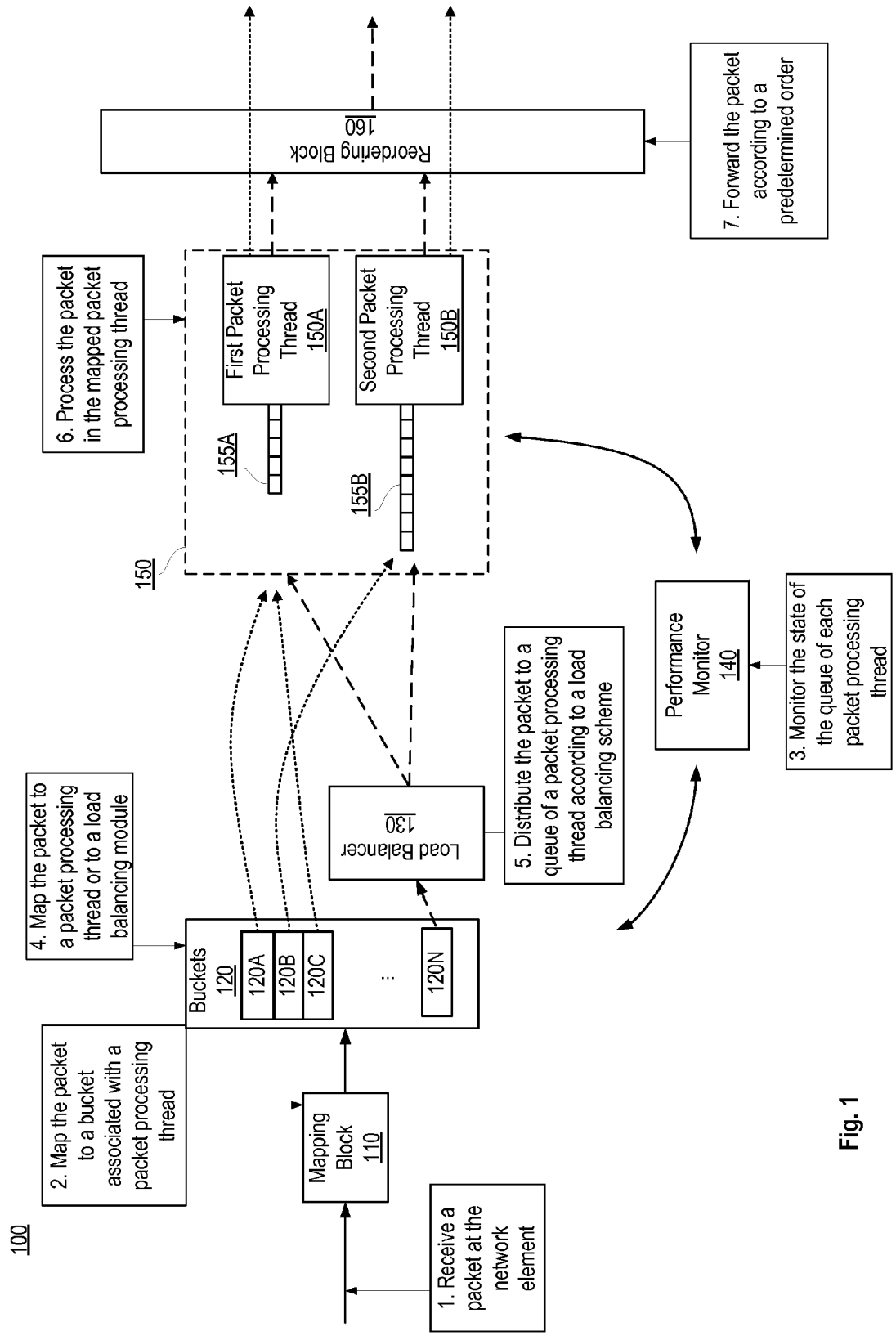
FIG. 1 illustrates operations in a network device for adaptive load balancing in packet processing according to one embodiment of the invention.

The following description describes methods and apparatuses for dynamically load balancing packets in packet processing. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A network device (ND) may include one or more network elements, as described in more details herein below.

Challenges of Flow Distribution in Packet Processing

In a network device implementing a forwarding network element, packets received may be classified and mapped to packet processing threads. For example, the forwarding network element is part of a forwarding plane in a packet forwarding architecture. The forwarding network element may be implemented to include one or more packet processing threads performing the forwarding tasks. Each packet processing thread performs a set of applicable lookup and forwarding functions on the received packets. A forwarding network element needs to ensure that packets of a flow do not get reordered by the network element during the forwarding process and are output in the same order they were received at the network element. Some approaches may be used to distribute the packets received at the network element over the packet processing threads.

According to a first approach, packets of a flow are mapped to the same packet processing thread for processing. In this example, the packets are processed in the packet processing thread and output from the network element in the order they are received. However, this approach does not perform well when there is a burst of packets from the same flow or when the flow is a heavy flow (sometimes referred to as an "elephant flow"), resulting in the oversubscription of the packet processing thread which may lead to packet drops. Elephant flows may take a large proportion (or all) of the processing time of the packet processing thread. In addition, the packet processing thread may get oversubscribed even in the absence of heavy flows, when a number of relatively heavy packet flows or a large number of flows (hashing skew) are mapped to the same packet processing thread. The oversubscription of a packet processing thread will lead to having the thread's queue backlogged and resulting in packet drops, while other packet processing threads in the network element may still have enough computing cycles available for processing the packets.

A second approach is performed to avoid the oversubscription of a packet processing thread as discussed in the above mentioned examples. In this second approach, packets received at the network element are distributed to a packet processing thread according to a load balancing technique. According to this approach, all packets received regardless of whether they are from a heavy flow or not are load balanced. As different packet processing threads may take a different amount of time to process each packet, packets of a flow may need to be reordered prior to being output to ensure that they are forwarded by the network element in the same order they were received. According to one approach, sequence numbers may be assigned to packets at ingress of the network element. The assigned sequence numbers can be used to re-order the packets after their processing and before their output from the network element. To ensure that the packets are reordered, following their processing all packets, which have at least one preceding packet not processed yet, are stored in a global buffering area. Thus, all packets received and processed in the packet processing threads are potentially queued in the global buffering area to be reordered prior to their output. The reordering can be implemented either as an inline function executed in the context of a packet processing thread or as a separate thread, where all packet processing threads add the processed packets to the queue of the reordering thread. In this later example, the reordering thread continues to service this queue and either adds the packet to the buffering area or transmits the packet out of the network element if all of its preceding packets have already been processed. In the approach where all packets are load balanced, the packets belonging to all flows are penalized as they are all load balanced and potentially all need to be reordered prior to being output by the network element. The penalty is applicable even if the load balancing is needed only for very few flows (e.g., the heavy flows) and a majority of flows could be transmitted without resorting to load balancing and reordering. Further in the example where the reordering is implemented as an inline function, a global synchronization across the packet processing threads to access the relevant staging area (i.e., buffering area) is needed.

Adaptive Load Balancing in Packet Processing

Given the challenges of implementing high performance packet processing, it is desirable to have an adaptive load balancing in a packet processing network element which allows efficient forwarding of packets and performs re-ordering of packets only when needed.

FIG. 1 illustrates operations in a network device for an adaptive load balancing of packets according to one embodiment of the invention. The network device includes a network element 100 configured or adapted to include a mapping block 110, one or more buckets 120, a load balancer 130, a performance monitor module 140, a set of one or more packet processing threads 150 and a reordering block 160. Task boxes 1 to 7 illustrate the order in which operations are performed according to one embodiment of the invention.

At task box 1, a packet is received at the network element. The packet is received through a network interface and forwarded to the mapping block 110. At task box 2, the mapping block 110 maps the packet to one of the buckets 120A-N. In one embodiment, each one of the buckets 120A-N is associated with one of the packet processing threads 150A-B. For example, upon receipt of a packet, the mapping block 110 may map the packet to the bucket 120A which is associated with the first packet processing thread 150A. In another example, upon receipt of the packet, the mapping block 110 may map the packet to the bucket 120N, which in turn is associated with the second packet processing thread 150B (not illustrated).

At task box 3, the performance monitor 140 determines whether the packet processing thread associated with the bucket is oversubscribed. Each of the packet processing threads 150A and 150B has a respective queue 155A-155B, for receiving the packets. According to some embodiments, each one of the buckets 120 is associated with a queue of a packet processing thread and feeds this queue with incoming packets to process. The performance monitor 140 monitors the state of each queue and determines whether the queue is backlogged.

Once the performance monitor 140 determines whether each of the packet processing threads 150A or 150B is oversubscribed or not, the buckets are configured at task box 4 to map the packet to one of the packet processing threads 150. The packet of a bucket (e.g., the bucket 120A) may be mapped to the packet processing thread associated with the bucket (e.g., as illustrated in FIG. 1, to the first packet processing thread 150A). Alternatively, the packet may be mapped to the load balancer 130 before being further mapped to one of the packet processing threads 150 according to a load balancing method. The choice between a direct mapping (bucket—associated thread) or a load-balancing mapping (bucket-load balancer-packet processing thread) is determined by the state of the packet processing thread associated with the bucket. When the performance monitor 140 determines that a packet processing thread is oversubscribed, at task box 5, the packets of the bucket associated with the thread are distributed across multiple packet processing threads according to the method implemented in the load balancer 130. When the performance monitor 140 determines that a packet processing thread is not oversubscribed, the packets of the bucket associated with the thread are mapped to the packet processing thread (i.e., direct mapping).

At task box 6, the packets of each queue 155A-155B are processed in the corresponding packet processing thread 150A-150B. In one embodiment, each packet processing thread runs on a different processor core. In an alternative embodiment, two or more threads may run on a single processor core. Each packet processing thread 150A-B processes a packet according to forwarding table(s) such that the packets are output to the appropriate physical network interfaces (NIs) or dropped. While two packet processing threads 150A and 150B are illustrated in FIG. 1, alternative embodiments of the invention could have any number of packet processing threads.

At task box 7, the packet is forwarded (i.e., dropped or output to the appropriate NI) according to a predetermined order. The order is based on the position of the packet relative to other packets at their receipt at the network element. In accordance with one embodiment, packets of a flow are received in a determined order ("ingress order"), mapped to the same bucket, and directly mapped to the same packet processing thread. In this embodiment, the packets may be output in this same order without needing any reordering in the reordering block 160. In some of these embodiments, the reordering block 160 may be skipped and the packets output following their processing in the packet processing thread. In accordance with another embodiment, packets of a flow are received in the ingress order and they are load balanced through multiple packet processing threads instead of being directly mapped to a single packet processing thread. This may occur, for example, when the associated packet processing thread is determined to be oversubscribed. In this example, the packets may be output from the packet processing threads in a different order than the ingress order. Thus, the packets are reordered prior to being forwarded to ensure that they are output from the network element according to the ingress order.

Even though the tasks of the task boxes 1-7 are described in a sequential order, some tasks may be performed concurrently or in a different order than described above. For example, monitoring the state of the queues may be performed periodically and simultaneously to the mapping of the packets to a packet processing thread (either directly—task box 4, or indirectly—task box 5). In other embodiments, additional or fewer tasks may be performed.

Flow Diagrams for Implementing Adaptive Load Balancing in Packet Processing

As described herein above, the network element is configured or adapted to perform an adaptive load balancing in packet processing. The packets of a flow received at the network element are mapped to an associated packet processing thread. The packets are alternatively distributed across multiple packet processing threads when their associated packet processing thread is oversubscribed and its queue backlogged. Packets of a flow may dynamically shift from being mapped to the packet processing thread or being load balanced across multiple threads in response to a change in the load of the associated packet processing thread.

The operations of the network element implementing adaptive load balancing in packet processing will be described with reference to the flow diagrams of FIG. 2 and FIG. 3. However, it should be understood that the operations of the packet processing module 100 can perform operations other than those discussed with reference to the flow diagrams of FIG. 2 and FIG. 3, and the embodiments discussed with reference to the flow diagrams of FIG. 2 or FIG. 3 can be performed by embodiments of the invention other than those discussed with reference to FIG. 1.

Figure 2:
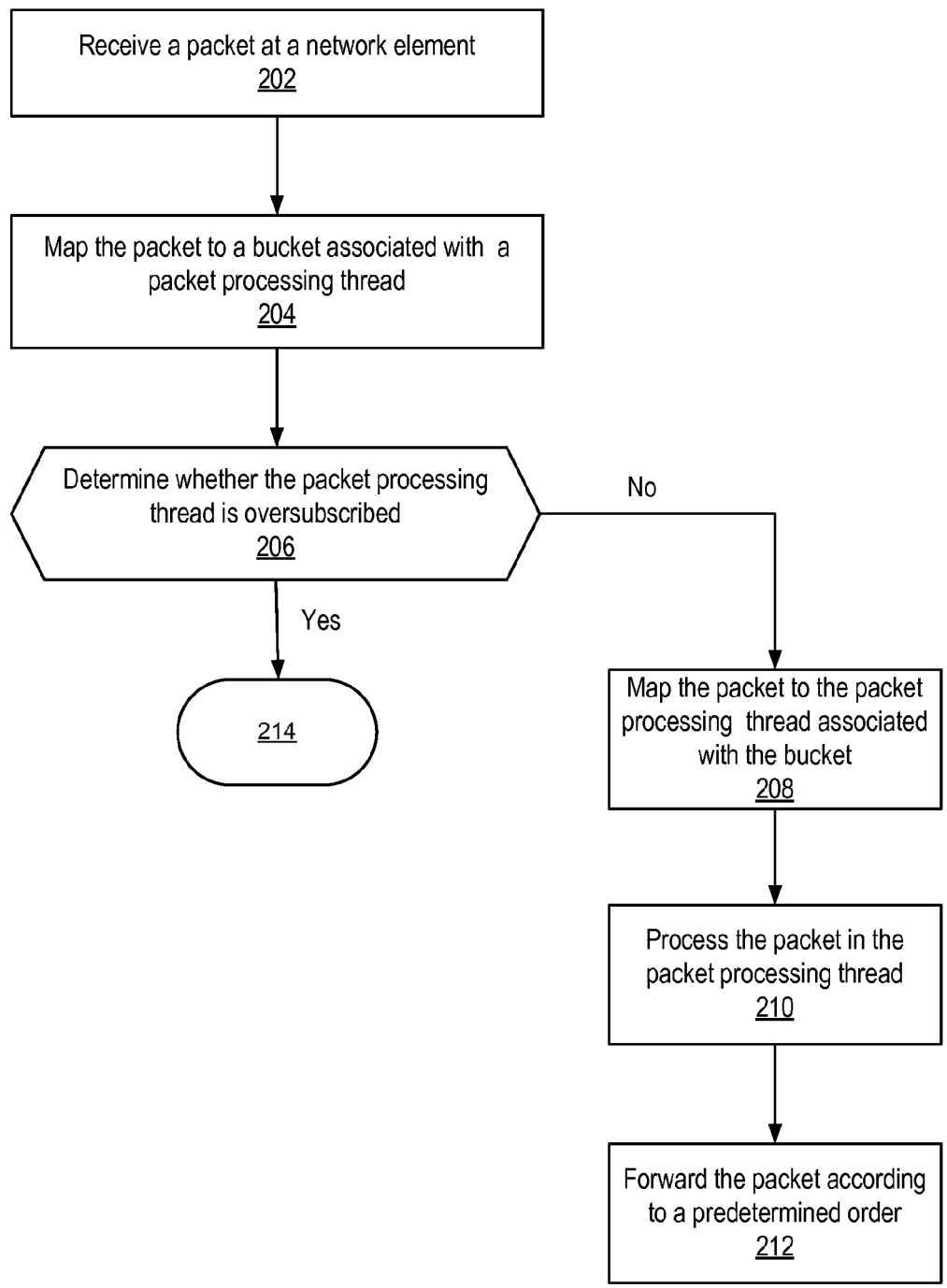
FIGS. 2-3 illustrate flow diagrams of operations for performing adaptive load balancing in a network device according to one embodiment of the invention.
Figure 3:
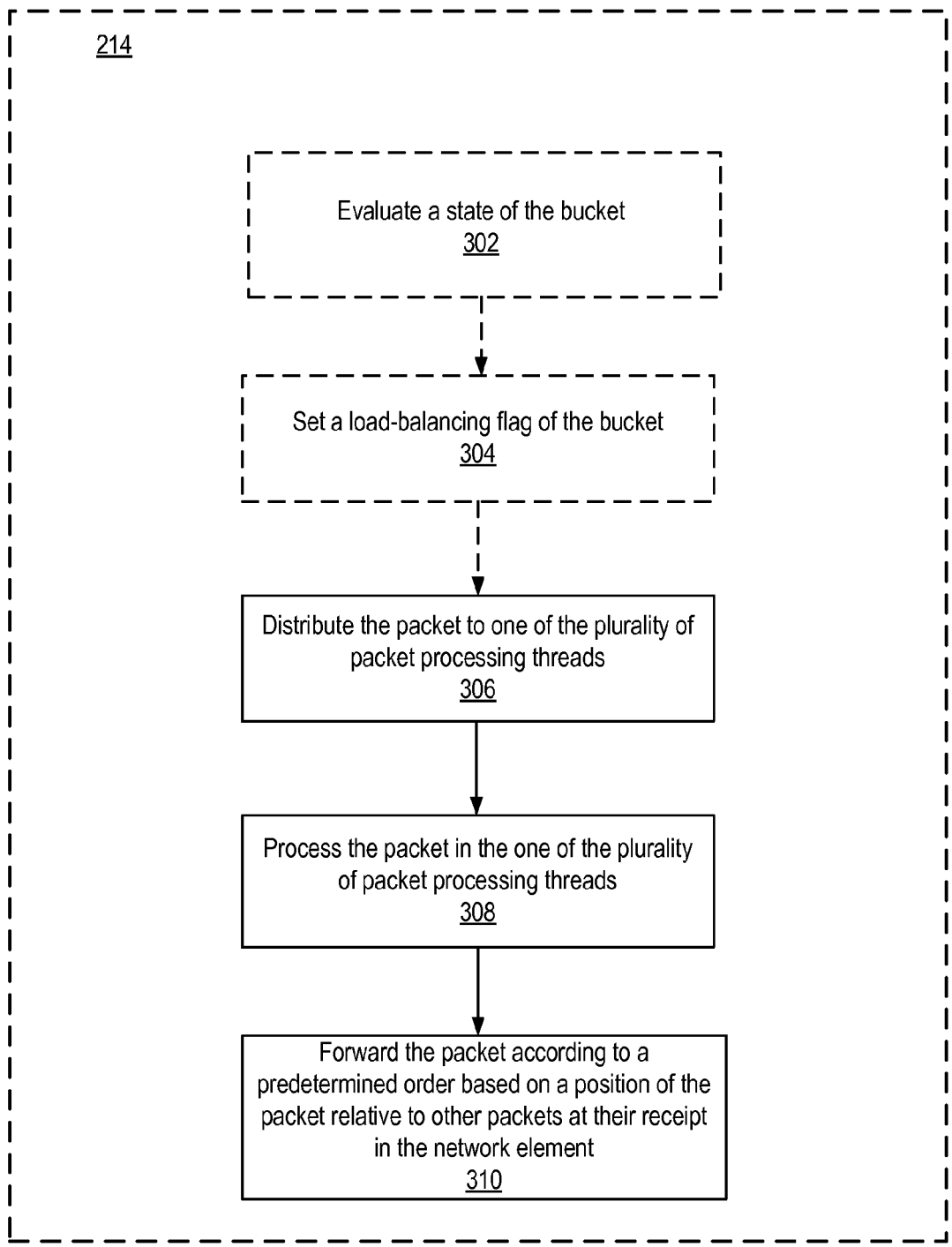

FIGS. 2-3 illustrate flow diagrams of operations for performing adaptive load balancing in a network device according to one embodiment of the invention. At block 202, a packet is received at the network element implemented in the network device. In some embodiments, the packet is received at a network interface (NI) and forwarded to the mapping block 110. Flow then moves to block 204.

At block 204, the mapping block 110 maps the packet to one of the buckets 120A-N. In one embodiment, each one of the buckets 120A-N is associated with one of the packet processing threads 150A-B. For example, upon receipt of a packet, the mapping block 110 may map the packet to the bucket 120A, which is associated with the first packet processing thread 150A. In another example, upon receipt of the packet, the mapping block 110 may map the packet to the bucket 120N, which in turn is associated with the second packet processing thread 150B (not illustrated). In one embodiment, the mapping is performed according to a hashing mechanism and the buckets are hash buckets. For example, information from the IP header of a packet (such as the destination address, the source address, the port number, etc.) may be used as indexes in a hashing table to retrieve a bucket identification for mapping the packets.

A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. In accordance with one embodiment, packets of a flow are mapped to the same bucket. Further, one or more flows may be mapped to the same bucket.

At block 206, the performance monitor 140 determines whether the packet processing thread associated with the bucket is oversubscribed. As illustrated in FIG. 1, each of the packet processing threads 150A and 150B has a queue 155A-155B, respectively, for receiving the packets to be processed. According to some embodiments, each one of the buckets 120 is associated with a queue of a packet processing thread and feeds this queue with packets. The performance monitor 140 is configured to monitor the state of each queue and to determine whether the queue is backlogged or not. According to some embodiments, in order to determine the state of a packet processing thread, the performance monitor 140 measures the length of its associated queue at a given instant and determines whether the queue length is above a predetermined threshold. According to an alternative embodiment, in order to determine the state of a packet processing thread, the performance monitor 140 determines an Exponential Weighted Moving Average (EWMA) Queue Length for its associated queue. The EWMA average queue length provides a measure of the average queue length over a determined period of time, which allows the performance monitor 140 to account for and ignore short bursts of packets in otherwise well behaved flows. The performance monitor 140 determines whether the EWMA queue length is above a predetermined threshold to determine whether the corresponding queue is backlogged and the packet processing thread is oversubscribed.

When the performance monitor 140 determines at block 206 that a packet processing thread 150A or 150B is oversubscribed, flow moves to operation 214. Alternatively, when the performance monitor 140 determines at block 206 that the packet processing thread is not oversubscribed, flow moves to operation 208. In some embodiments, the monitoring of the queues 155A-155B is performed on a periodic basis, and whenever an irregular behavior of the queue is determined (e.g., the EWMA queue length is above a predetermined threshold), flow moves to block 214.

At block 208, the packets included in the bucket associated with the packet processing thread are mapped to the corresponding thread. In one embodiment of the invention, upon monitoring the state of the queue 155A, the performance monitor 140 determines that the packet processing thread 150A is not oversubscribed. The packets mapped to the bucket 120A are then directly mapped to their corresponding packet processing thread 150A and are added to the corresponding queue 155A. Flow then moves from block 208 to block 210 where the packets of the queue are processed in the packet processing thread.

In one embodiment, each packet processing thread runs on a different processor core. In an alternative embodiment, two or more threads may run on a single processor core. The packet processing threads 150A-B are configured to make forwarding decisions and to perform an action on a packet, based upon an entry in a forwarding table, by executing a set of actions identified in the matched forwarding table entry on the packet. The entry of the forwarding table may be identified during a packet classification operation (not illustrated in FIG. 1). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

The packet processing threads 150 may further be configured or adapted to include forwarding features such as quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing). In one embodiment, the packet processing threads 150 may forward the packets with any required encapsulation modifications. For example, packet processing threads of a network element implementing IP router functionality may forward, modify, drop, delay, or otherwise operate on IP packets on the basis of some of the IP header information in the IP packet, where IP header information includes source IP address, destination IP address, source port, destination port (where "source port" and "destination port" refer herein to protocol ports, as opposed to physical ports of a ND), transport protocol (e.g., user datagram protocol (UDP) (Internet Engineering Task Force (IETF) Request for Comments (RFC) 768, 2460, 2675, 4113, and 5405), Transmission Control Protocol (TCP) (IETF RFC 793 and 1180), and differentiated services (DSCP) values (IETF RFC 2474, 2475, 2597, 2983, 3086, 3140, 3246, 3247, 3260, 4594, 5865, 3289, 3290, and 3317). While the embodiments above have been described in relation to two packet processing threads 150A and 150B, alternative embodiments could have any number of packet processing threads.

Flow then moves from operation 210 to 212. At block 212, following the processing of the packets in the packet processing threads, the packets are forwarded according to a predetermined order (unless the forwarding decision made at the preceding operation was to drop the packet). Referring back to operation 204, according to one embodiment, the packets of a single flow are mapped to the same bucket (e.g., bucket 120A). According to this embodiment, if the packet processing thread 150A associated with the bucket 120A is determined not to be oversubscribed, the packets mapped to the bucket 120A are added to the queue 155A and are processed in the order they are received at the network element (i.e., the ingress order) and can therefore be output in the same order. According to an alternative embodiment, the packets from multiple flows are mapped to the same bucket 120A. In this alternative embodiment, if the packet processing thread 150A associated with the bucket 120A is determined not to be oversubscribed, the packets of each one of the flows are mapped to the queue 155A. The packets are then processed in the ingress order and are therefore output in the same order.

In the embodiments described immediately above, the packets of a flow are processed in the same order they were received in the network element and re-ordering of the packets is not needed prior to their output. The order of output is defined by the position of a packet relative to the other packets of the same flow at their receipt in the network element. Alternatively, the order of output is defined by the position of a packet relative to the other packets from the multiple flows mapped to the same bucket, at their receipt in the network element. Thus, the need for outputting processed flows according to the ingress order is met by the network element while providing an efficient forwarding of the packets when the queues of the packet processing threads are not backlogged.

Referring back to operation 206, when the performance monitor 140 determines that a packet processing thread (e.g., the packet processing thread 150B) is oversubscribed, flow moves from block 206 to block 214. FIG. 3 illustrates detailed operations performed in the network element when a packet processing thread is determined to be oversubscribed according to one embodiment of the invention. At block 302, the performance monitor 140 evaluates a state of the bucket(s) associated with the oversubscribed thread to determine if the bucket(s) is the cause of the oversubscription. For example, the performance monitor 140 may determine whether a state of a bucket(s) is above a predetermined threshold. The state of the bucket may be evaluating based on a counter value for the bucket, wherein the counter value is indicative of the number of packets in the bucket and/or an exponential weighted moving average (EWMA) value of the packet rate for the bucket. In one example, packet counters and/or a EWMA packet increment are maintained for each bucket. The EWMA packet increment may be determined with sampling of delta packets received at periodic time intervals. This EWMA packet increment is an indication of the number of packets mapped to a hash bucket in a recent past. Upon determination that the packet processing thread is oversubscribed, the performance monitor 140 may evaluate the state of each bucket mapped to the oversubscribed thread.

In one embodiment, a single bucket is associated with the oversubscribed packet processing thread. In this embodiment, upon determination that the queue is backlogged, flow moves to block 304. In another embodiment, multiple buckets are associated with the oversubscribed packet processing thread and the performance monitor 140 determines which bucket (or buckets if more than one bucket cause the oversubscription) has a state above the predetermined threshold. For example, buckets with EWMA packet increment which have a value higher than a predetermined threshold sent proportionally higher traffic in the recent past to the packet processing thread and need to be load-balanced. A bucket 120 may cause the oversubscription of a packet processing thread if a heavy flow (e.g., an elephant flow) is mapped to the bucket or when the mapping method (implemented in the mapping block 110) leads to mapping a large number of flows (hashing skew) to the same bucket.

At block 304, a load-balancing flag is set for each bucket which was determined to cause the oversubscription of the packet processing thread. In one embodiment, as illustrated in FIG. 1, a single bucket may be the cause of the oversubscription and therefore the load-balancing flag of the bucket 120N is set while the load-balancing flags of the buckets 120A, 120B and 120C are not set (i.e., cleared). In another embodiment, more than one bucket may be the cause of the oversubscription (not illustrated), and each one of their load-balancing flag is set. In all embodiments, the load-balancing flags of buckets which did not cause the oversubscription are cleared. In addition, when a load-balancing flag of a bucket is set, it is an indication that the bucket needs to be load balanced. In one embodiment, the states of the load balanced buckets are monitored on a periodic basis, and when a state decreases below the predetermined threshold, the load-balancing flag is cleared and the corresponding bucket shifts to a direct mapping mode of operation in which flows are directly mapped to the associated packet processing thread without being load balanced. In some embodiments, the load balancing flag of a bucket is cleared when the associated packet processing thread is no longer determined to be oversubscribed. The performance monitor 140 may, upon determination that the queue of the thread is no longer backlogged, cause the load balancing flag of the associated bucket to be cleared. Flow moves from block 304 to block 306.

Going back to block 206 from FIG. 2, in an alternative embodiment, upon determination of the oversubscription of a packet processing thread, block 302 and/or 304 may be skipped and block 306 is performed directly following the performance of block 206.

According to these embodiments, the state of the bucket is dynamically shifted from a first mode ("direct mapping"), in which packets of a flow are mapped to the same packet processing thread, to a second mode ("load balancing"), in which the packets of the flow are distributed over multiple packet processing threads. The shift of the bucket from the first mode to the second mode is based on the determination of whether the queue of the packet processing thread associated with the bucket is backlogged or not. Additionally, the shift of the bucket from the second mode to the first mode may be based on the state of the bucket and/or the state of its associated thread's queue. The periodic monitoring of the queue of a thread and/or of the state of a bucket allows for dynamically setting the bucket in the appropriate mode such that forwarding of packets is performed efficiently while avoiding load balancing flows when not needed. The periodic monitoring of the thread's queue allows for dynamic distribution of packets of a flow to a packet processing thread according to the appropriate mode (i.e., direct mapping or load balancing) such that the packets are processed efficiently, in the network element, while avoiding load balancing of flows and reordering of packets when not needed.

At block 306, a packet included in the bucket(s) associated with the oversubscribed packet processing thread is forwarded to the load balancer 130. For example, the packets of the bucket 120N are forwarded to the load balancer 130 upon determination by the performance monitor 140 that the packet processing thread 150B is oversubscribed. The packets are then distributed over the multiple packet processing threads 150 for processing, according to a load balancing mechanism.

In one embodiment, the packets are distributed over all the packet processing threads (e.g., 150A and 150B). Alternatively, the packets are distributed to a subset of the packet processing threads 150. For example, if the thread 150B is determined to be oversubscribed, the load balancer may be configured to distribute the packets to all the packet processing threads except the oversubscribed thread 150B. The load balancing of the packets of a bucket may be performed according to a Round-Robin mechanism, a random distribution mechanism, or another distribution mechanism which may take additional factors into account (e.g., heuristics, current workloads, queue lengths at the packet processing threads, etc.). According to one embodiment, packets of a single flow are included in the bucket and are distributed over multiple packet processing threads. In another embodiment, packets of multiple flows are included in the bucket and distributed over multiple packet processing threads. Flow then moves to block 308.

At block 308, a packet is processed in the packet processing thread at which it was assigned. The processing of the packet in the packet processing thread at block 308 may be similar to processing performed at block 210. Flow then moves to block 310.

Figure 5:
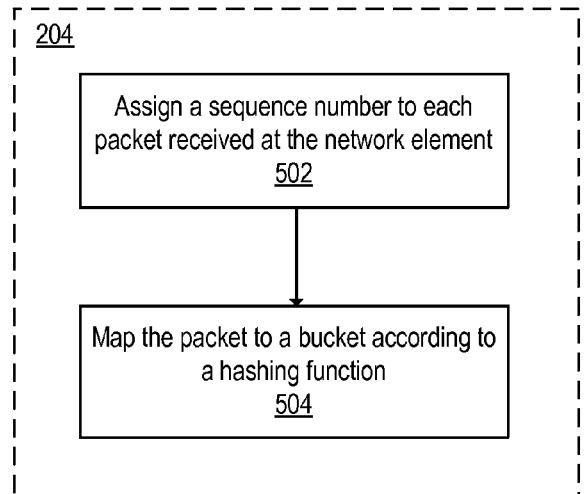
FIG. 5 illustrates a flow diagram of detailed operations performed in the network device when a packet processing thread is mapped to a bucket according to one embodiment of the invention.
Figure 6:
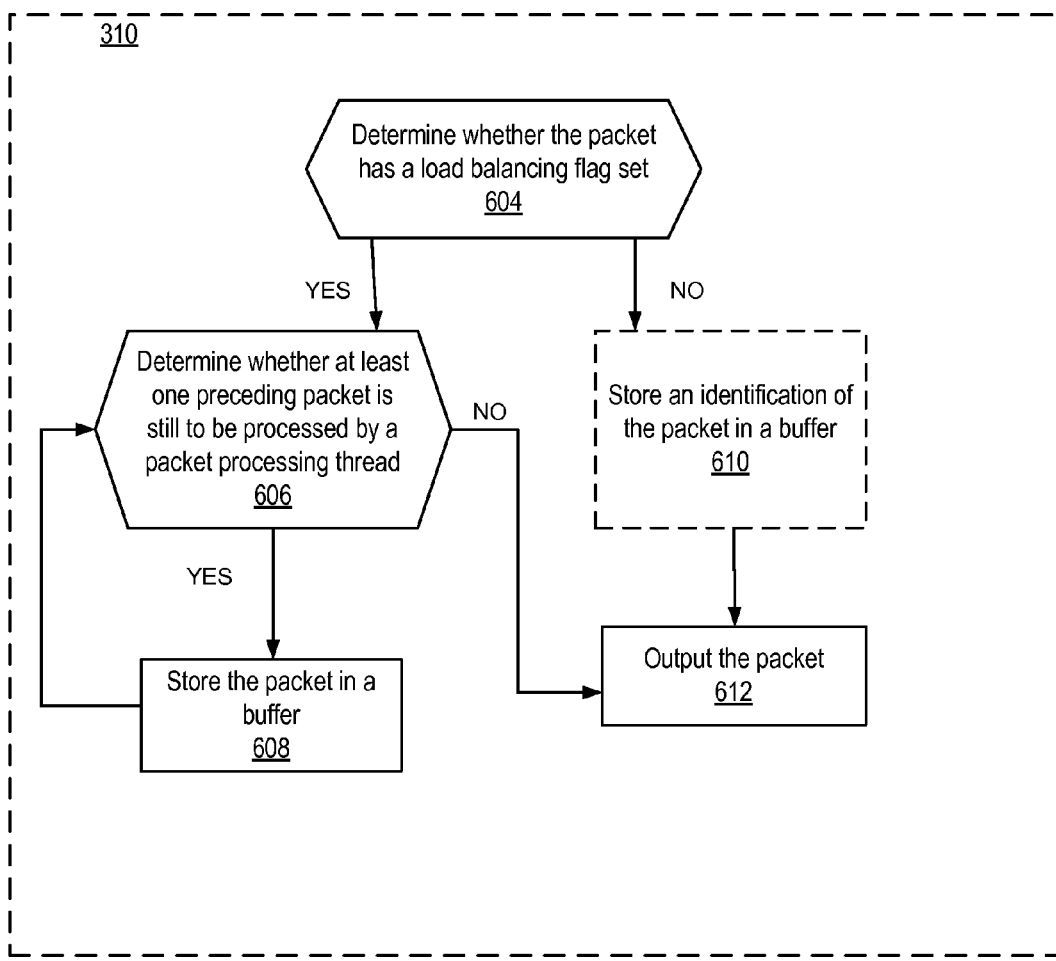
FIG. 6 illustrates a flow diagram of detailed operations performed in the network device for reordering the packets according to one embodiment of the invention.

At block 310, the packet is forwarded (e.g., output via the appropriate NI unless it is dropped) according to a predetermined order. The predetermined order is based on the position of the packet relative to other packets at their receipt in the network element. According to one embodiment, the packet is forwarded according to its position relative to other packets of the same flow at their receipt in the network element. In another embodiment, the packet is forwarded according to its position relative to other packets of multiple flows, at their receipt in the network element. The processing of the packets may take varying amounts of time from one thread to another. Consequently, re-ordering of the packets may be needed prior to their output from the network element to ensure that the packets are forwarded according to their ingress order. The reordering block 160 receives the packets processed in the multiple packet processing threads and performs the reordering of the packets of a flow (or aggregate flows) prior to forwarding the packets. For each packet received, the reordering block 160 determines whether all packets received at the network element before the packet were reclaimed (dropped or output to the appropriate network interface) prior to outputting the packet. Multiple mechanisms may be used to implement the reordering block 160. In accordance with some embodiments, the packets may be reordered according to assigned sequence numbers. The sequence numbers may be assigned within the network element at receipt of the packets, or prior to their receipt in the network element. For example, the sequence numbers may be part of meta-data of the packets. The embodiments described with reference to FIG. 4, FIG. 5, and FIG. 6 illustrate exemplary embodiments for performing reordering of load balanced packets in a network element.

Packet Sequencing and Re-Ordering

Figure 4:
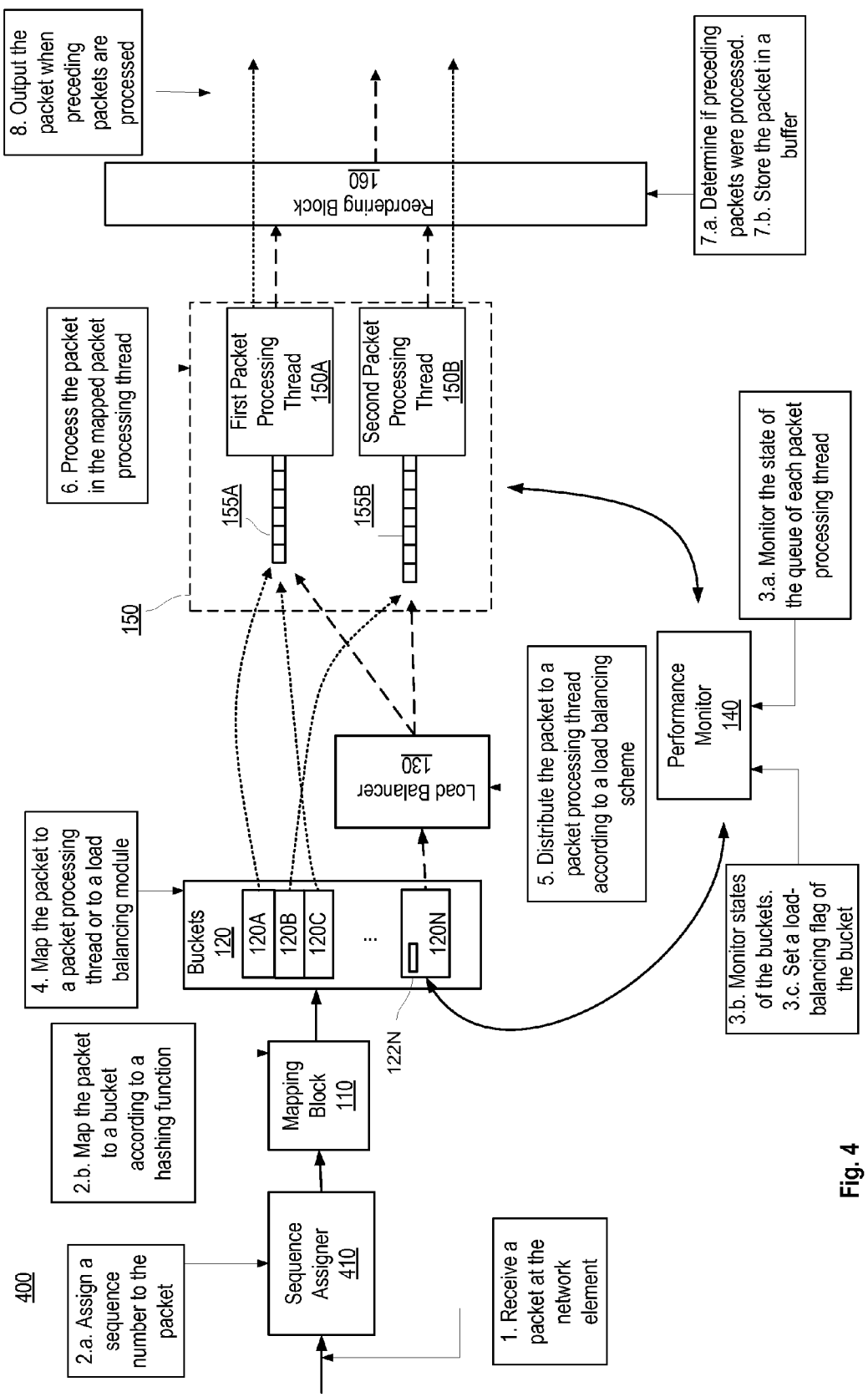
FIG. 4 illustrates operations in a network device for adaptive load balancing in packet processing according to one embodiment of the invention.

FIG. 4 illustrates operations in a network device for adaptive load balancing in packet processing according to one embodiment of the invention. FIG. 4 contains elements and task boxes similar to FIG. 1. The same or similar references indicate elements or components having the same or similar functionalities. In addition to the modules described with reference to FIG. 1, the network element 400 is further configured to include a sequence assigner 410. Task boxes 1 to 8 illustrate the order in which operations are performed according to one embodiment of the invention.

At task box 1, a packet is received at the network element. The packet is received through a network interface and forwarded to the sequence assigner 410. At task box 2.*a*., a sequence number is assigned to each incoming packet. The sequence number assigned is later used at the reordering block 160 to ensure that the packets exit the network element in the same order they entered. According to one embodiment, the packets are assigned a sequence number on a flow basis, such that packets of the same flow are assigned different numbers of the same sequence. According to another embodiment, the packets are assigned a sequence number on an aggregate flow basis, such that packets of multiple flows are assigned different numbers of the same sequence (e.g., flows received at the same physical port, flows with the same protocol port, or all flows received at the network element, etc.). In some embodiments, prior to being assigned a sequence number, each packet may pass a validity check.

At task box 2.*b*., the mapping block 110 maps the packet to one of the buckets 120A-N, e.g., according to a hashing mechanism. In one embodiment, each one of the buckets 120A-N is associated with one of the packet processing threads 150A-B. For example, upon receipt of a packet, the mapping block 110 may map the packet to the bucket 120A which is associated with the first packet processing thread 150A. In another example, upon receipt of the packet, the mapping block 110 may map the packet to the bucket 120N, which in turn is associated with the second packet processing thread 150B (not illustrated). In accordance with some embodiments, the mapping block 110 may be configured or adapted to perform header parsing and packet classification. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case, the system is typically configured to determine one forwarding table entry from the many according to a defined scheme (e.g., selecting a first forwarding table entry that is matched).

At task box 3.a., the performance monitor 140 determines whether the packet processing thread associated with the bucket is oversubscribed. The performance monitor 140 tracks the state of each queue and determines whether the queue is backlogged. At task box 3.b., the performance monitor 140 is further configured or adapted to track the state of each bucket. The states of the buckets are indicative of the number of packets mapped to the bucket in a recent past. Upon determination of an oversubscription of a queue, the performance monitor 140 evaluates the state of the buckets and sets a load-balancing flag, at task box 3.c., for each bucket which is determined to cause the oversubscription of the queue.

Once the performance monitor 140 determines whether each of the packet processing thread 150A or 150B is oversubscribed or not, the buckets are configured or adapted at task box 4 to map the packet to one of the packet processing threads 150. The packets of a bucket (e.g., the bucket 120A) may be mapped to the packet processing thread associated with the bucket (e.g., as illustrated in FIG. 1, to the first packet processing thread 150A). Alternatively, the packets may be mapped to the load balancer 130 before being further mapped to one of the packet processing threads 150 according to a load balancing method. The choice between a direct mapping (bucket-associated thread) or a load-balancing mapping (bucket-load balancer-packet processing thread) is determined by the state of the packet processing thread associated with the bucket. When the performance monitor 140 determines that a packet processing thread is oversubscribed, the packets of the bucket associated with the thread are distributed across multiple packet processing threads according to the method implemented in the load balancer 130. When the performance monitor 140 determines that a packet processing thread is not oversubscribed, the packets of the bucket associated with the thread are mapped to the packet processing thread (i.e., direct mapping). According to another embodiment, the choice between direct mapping and load balancing mapping is further determined based on the state of the bucket and the load balancing flag. When the load-balancing flag of a bucket is set, the packets of the buckets are transmitted to the load balancer 130 for distribution over the multiple packet processing threads. When the load balancing flag of the bucket is cleared or not set, the packets are mapped directly to the associated packet processing thread.

At task box 6, the packets of each queue 155A-155B are processed in the corresponding packet processing thread 150A-150B. In one embodiment, each packet processing thread runs on a different processor core. In an alternative embodiment, two or more threads may run on a single processor core. Each packet processing thread 150A-B processes a packet according to forwarding table(s) such that the packets are output to the appropriate physical network interfaces (NIs) or dropped. While two packet processing threads 150A and 150B are illustrated in FIG. 1, alternative embodiments of the invention could have any number of packet processing threads.

At task box 7.a., upon receipt of a processed packet, the reordering block 160 determines whether the packets preceding the received packet were previously forwarded prior to forwarding the packet. The exit order of the packets is based on the sequence numbers assigned to the packets at the ingress of the network element. In some of these embodiments, the reordering block 160 may be skipped and the packets are output following their processing in the packet processing thread without being reordered. In other embodiments, when packets of a flow are distributed over multiple packet processing threads, they are no longer processed according to the sequence numbers assigned at task 2.a. In this example, the packets may be output from the packet processing threads in a different order than the ingress order. The packets are reordered prior to being forwarded to ensure that they are output from the network element according to the order assigned at ingress. At task box 8, the packets are output in the ingress order.

Even though the tasks of the task boxes 1-8 are described in a sequential order, some tasks may be performed concurrently or in a different order than described above. For example, monitoring the state of the queues may be performed periodically and simultaneously to the mapping of the packets to a packet processing thread (either directly—task box 4, or indirectly—task box 5). In other embodiments, additional or fewer tasks may be performed.

The operations in the flow diagrams of FIG. 5 and FIG. 6 will be described with reference to the exemplary embodiments of FIG. 4. However, it should be understood that the operations of the flow diagrams can be performed by embodiments of the invention other than those discussed with reference to FIG. 4, and the embodiments of the invention discussed with reference to FIG. 4 can perform operations different than those discussed with reference to the flow diagrams of FIG. 5 or FIG. 6.

FIG. 5 illustrates detailed operations performed in the network element when a packet processing thread is mapped to a bucket. At block 502, a sequence number is assigned to each incoming packet. The assigned sequence number is later used at the reordering block 160 to reorder packets of a flow and ensure that they exit the network element in the same order they entered. According to one embodiment, the packets are assigned sequence numbers on a flow basis, such that packets of the same flow are assigned different numbers from the same sequence. According to another embodiment, the packets are assigned a sequence number on an aggregate flow basis, such that packets of multiple flows are assigned different numbers of the same sequence (e.g., flows received at the same physical port, flows with the same protocol port, or all flows received at the network element, etc.). In one embodiment, all packets received at the network element are assigned a sequence number from a single global pool of numbers. In other words, all packets from the different flows received at the network element (received through one or more ports) are numbered according to this global pool. In another embodiment, distinct pools of sequence numbers may be used. Multiple flows may be grouped to be assigned numbers from a particular pool. For example, the packets may undergo a basic classification at ingress, and mapped to one of the sequence number pools. In this case, a pool identification (Pool ID) can be marked in the meta-data associated with the packets to identify the pool. The assigned sequence numbers and Pool ID are later used at the reordering block 160 to reorder packets of a flow and ensure that they exit the network element in the same order they entered with respect to their assigned pool. In some embodiments, prior to being assigned a sequence number, each packet may pass a validity check.

At block 504, the mapping block 110 maps the packet to one of the buckets 120A-N, e.g., according to a hashing mechanism. In accordance with some embodiments, the mapping block 110 may be configured or adapted to perform header parsing and packet classification. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry), in the forwarding tables, best matches the packet based upon the match structure, or key, of the forwarding table entries. It is possible that many flows represented in the forwarding table entries can correspond/match to a packet; in this case, the system is typically configured to determine one forwarding table entry from the many according to a defined scheme (e.g., selecting a first forwarding table entry that is matched).

In the illustrated embodiment of FIG. 4, each one of the buckets 120A-N is associated with one of the packet processing threads 150A-B. For example, upon receipt of a packet, the mapping block 110 may map the packet to the bucket 120A, which is associated with the first packet processing thread 150A. In another example, upon receipt of the packet, the mapping block 110 may map the packet to the bucket 120N, which in turn is associated with the second packet processing thread 150B (not illustrated). The mapping block 110 parses the packet header and performs a Hash Table Lookup to map the packet to a bucket (referred as a "hash bucket" herein). The hash bucket provides the packet processing thread which should process the packet. In one example, the mapping occurs via a hash table which has (N×Total Thread Count) entries, such that N buckets may be associated with a packet processing thread. The number N may be set to a reasonably large value (e.g., 16 or 32). The hash table will contain multiple N entries mapping to a single packet processing thread 150. The use of multiple buckets per packet processing thread allows the decomposition of sets of flows being mapped to that thread into smaller subsets (i.e., the buckets).

Each hash bucket is configured or adapted to have a load balancing flag which determines the mode of operation of the bucket. In one embodiment, when the load balancing flag is cleared or not set, the packets of the bucket are directly mapped to the packet processing thread associated with the bucket. In contrast, when the load balancing flag is set, the packets of the bucket are mapped to the load balancer 130 to be distributed over multiple packet processing threads 150. In some embodiments, the load balancing flags of the buckets 120 are cleared by-default. A load balancing flag is switched from a first state (i.e., a direct mapping state) to a second state (i.e., load balancing state) in response to the detection of an oversubscription of the packet processing thread associated with the bucket. The load balancing flag is further switched back from the second state (load balancing state) to the first state (direct mapping) in response to the detection that the packet processing thread is no longer oversubscribed. The periodic monitoring of the queue of the packet processing thread allows for dynamically setting the bucket in the appropriate mode such that forwarding of the packets is performed efficiently while avoiding load balancing flows when not needed. In some embodiments, the load balancing flag of the bucket is copied to the meta-headers for all packets mapped to the hash bucket. Thus, each packet contains an indication of whether it is being directly mapped to a packet processing thread along with all the packets of the same flow, or alternatively, if the packets of the flow are being load balanced across multiple packet processing threads.

In accordance with some embodiments, in order to determine the state of a packet processing thread, the performance monitor 140 measures the length of its associated queue at a given instant and determines whether the queue length is above a predetermined threshold. According to an alternative embodiment, in order to determine the state of a packet processing thread, the performance monitor 140 determines an Exponential Weighted Moving Average (EWMA) Queue Length for its associated queue. The EWMA average queue length provides a measure of the average queue length over a determined period of time, which allows the performance monitor 140 to account for and ignore short bursts of packets in otherwise well behaved flows. The performance monitor 140 determines whether the EWMA queue length is above a predetermined threshold to determine whether the corresponding queue is backlogged and the packet processing thread is oversubscribed.

In accordance with one embodiment, each flow of packets received at the network element is mapped to a distinct hash bucket (i.e., the number of hash buckets is equal to or greater than the number of flows received at the network element). Thus, the identification of the flow responsible for the irregular behavior and the oversubscription of a packet processing thread is performed by the identification of the bucket causing the oversubscription.

In one embodiment, flows mapped to the load balanced buckets, may get processed in various orders and may output the packet processing threads in an order different from their ingress order. Thus packets of the load balanced flows may need to be reordered prior to being output from the network element. In contract, the flows mapped directly to an associated packet processing thread will be processed and output according to their ingress order and will not need to be re-ordered.

FIG. 6 illustrates detailed operations performed in the network element for reordering the packets. Following their processing in the packet processing threads 150, the packets are forwarded to the reordering block 160. The reordering block 160 performs re-sequencing of the packets according to their position with respect to other packets of the same flow at their receipt in the network element. At block 604, upon receipt of a packet of a flow, the reordering block 160 determines whether the packet has a load balancing flag set, indicating that the packet is part of a flow which was load balanced. When the load balancing flag is set, the reordering block determines, at block 606, whether at least one packet preceding the received packet is still to be processed, or has not yet completed its processing, by a packet processing thread. In other words, the reordering block 160 determines whether all packets preceding the received packet were forwarded or not. If all packets preceding the received packet were already processed and forwarded, the received packet is output, as illustrated at block 612. If at least one packet is still to be processed or has not yet completed its processing, the received packet is stored in a buffering area, at block 608, until all of its preceding packets are processed. The packets with load balancing flags set may be buffered to ensure that the packets exit the network element in the same order in which they entered. In some embodiments, the reordering is based on the sequence numbers assigned at block 502. For example, at ingress of the network element multiple packets are received and assigned a sequence number from 1-103. In this example, at least some of the packets are mapped to the packet processing thread according to a load balancing technique. For example, packet 103 is load balanced and its load balancing flag is set. Following processing the packet 103 in the packet processing thread, it is received at the reordering block 160. The reordering block 160 may have received and output packets with sequence numbers 1-100 but not the packets 101 and 102. Upon receipt of the packet 103, the reordering block 160 determines whether its load balancing flag is set (at block 604), and determines whether all its preceding packets have been processed (the packets 1 to 102). Upon determination that the packets 101 and 102 have not been processed yet, the packet 103 is stored in the buffering area (at block 608) until each of the packets with the sequence numbers 101 and 102 is received and output, or dropped and its sequence number is released.

Referring back to block 604, upon determination that the load balancing flag of the packet is not set or is cleared (i.e., the packet was directly mapped to an associated packet processing thread with all packets from the same flow, and the flow was not load balanced), the packet is forwarded, at block 612, without reordering. Alternatively, in some embodiments, prior to being output, a token with the same sequence number as the packet may be created and stored in the buffering area, at block 610, while the actual packet is output (at block 612). For example, a single pool of sequence numbers is used for multiple flows received at the network element. The flows may be received at the network element in an interleaved manner. A first subset of the flows (e.g., at least one flow of packets) is mapped to a first bucket and a second subset of the flows (e.g., at least one flow of packets) is mapped to a second bucket. The first bucket may be in a direct mapping mode while the second bucket is in a load balancing mode. According to this embodiment, some packets with sequence numbers from the pool may have been processed in sequence with respect to the other packets of the flow they belong to, while packets from the second subset may not be processed in sequence as they are load balanced over multiple packet processing threads. Consequently, packets from the first subset and the second subset may reach the reordering block in a random order with respect to each other, different from the order at which the packets (from the first subset and the second subset) entered the network element with respect to each other. However, in this example, the reordering module 160 uses the sequence numbers of the pool to reorder and output the packets according to their ingress order. Therefore, even if a packet is not load balanced, the reordering module 160 may still need to account for the sequence number of this packet while reordering the load-balanced packets. In this example, the token sequence number is used to account for the packet of the directly mapped flows. Even though the packets of the directly mapped flows are output, their tokens are stored in the buffering area (at block 610) to ensure that the packets of the load balanced flows from the same pool are output in the proper ingress order. In this particular example, the packets of the flows of the first bucket are output directly and a token may be stored in the buffering area for each one of them, while the packets of the second bucket are stored in the buffering area.

In some embodiments, when the packets are assigned sequence numbers, at block 502, from different pools of numbers, the pool ID is taken into consideration while reordering the packets in the reordering block 160. The pool ID copied in the meta-header of each packet is used during the reordering. The load balanced packets are reordered with respect to packets with the same pool ID.

The embodiments of the disclosed techniques provide an adaptive packet processing mechanism that aims to provide high performance packet processing by selecting between a direct flow mapping and load balancing mapping for each flow received at a network element depending on the state of the packet processing threads forwarding the packets. The embodiments of the disclosed techniques allow for a majority of the flows to be processed according to a direct mapping (flow—thread), avoiding the cost of reordering. The embodiments of the disclosed techniques further allow load balancing flows only when needed. Thus, the adaptive packet processing re-orders the packets only when needed.

Embodiments of the adaptive load balancing in packet processing, as described with reference to FIGS. 1-6 may be implemented in a Network Element (NE) as described in more details herein. In particular, embodiments of the disclosed techniques may be implemented in a forwarding virtual network function (Forwarding VNF) of a virtual network element (VNE).

SDN and NFV Environment Utilizing Embodiments of the Invention

Figures 7A, 7B:
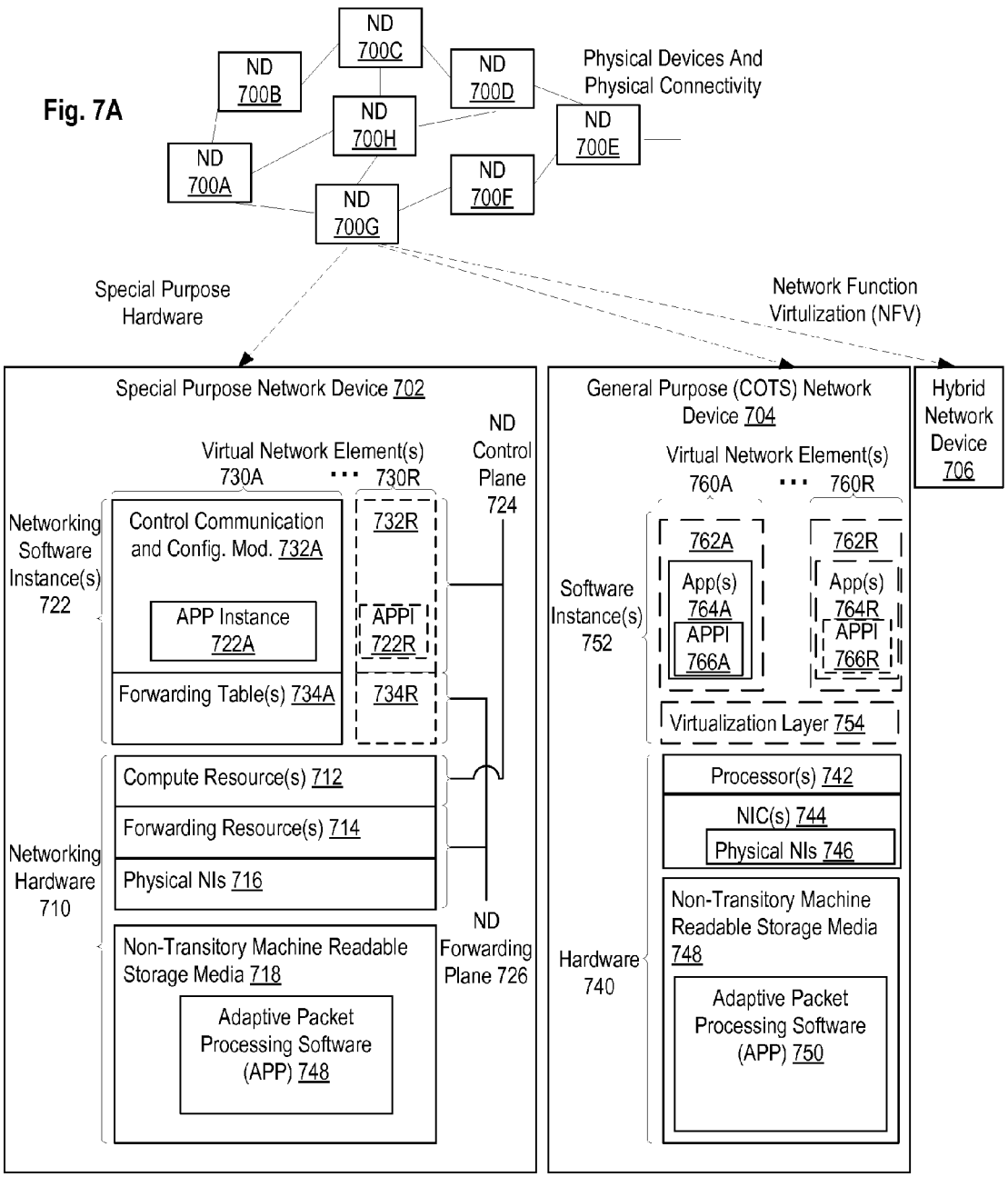
FIG. 7A illustrates connectivity between network devices (NDs) within an exemplary network, as well as three exemplary implementations of the NDs, according to some embodiments of the invention.
FIG. 7B illustrates an exemplary way to implement the special-purpose network device 702 according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R. The virtual network elements 730A-R may include instances 722A-722R of an adaptive packet processing software (APP) 748 implementing embodiments of the invention as described with reference to FIGS. 1-6. Each instance 722A is configured to process and forward packets received at the network device 702 by mapping a packet to a packet processing thread according to a direct mapping scheme or a load balancing scheme based on the state of the packet processing thread's queue.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used. The virtual network elements 760A-R may include instances 766A-766R of an adaptive packet processing software (APP) 750 implementing embodiments of the invention as described with reference to FIGS. 1-6. Each instance 766A is configured to process and forward packets received at the network device 704 by mapping a packet to a packet processing thread according to a direct mapping scheme or a load balancing scheme based on the state of the packet processing thread's queue.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). In some of these embodiments, the actual forwarding function (forwarding plane) is performed in a plurality of packet processing threads instantiated by each one of the APPI 733A-733R or APPI 766A-766R. The data received on the physical NRs is distributed to a packet processing thread based on one of the embodiments of the invention described with respect to FIGS. 1-6.

Figure 7C:
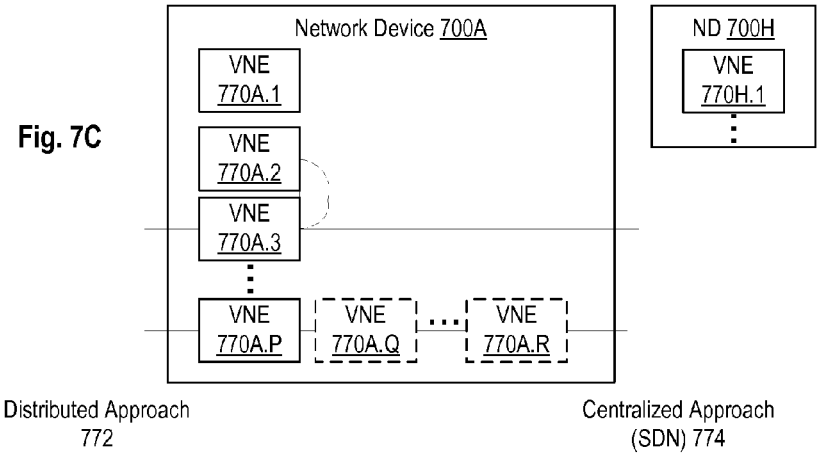
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 7D:
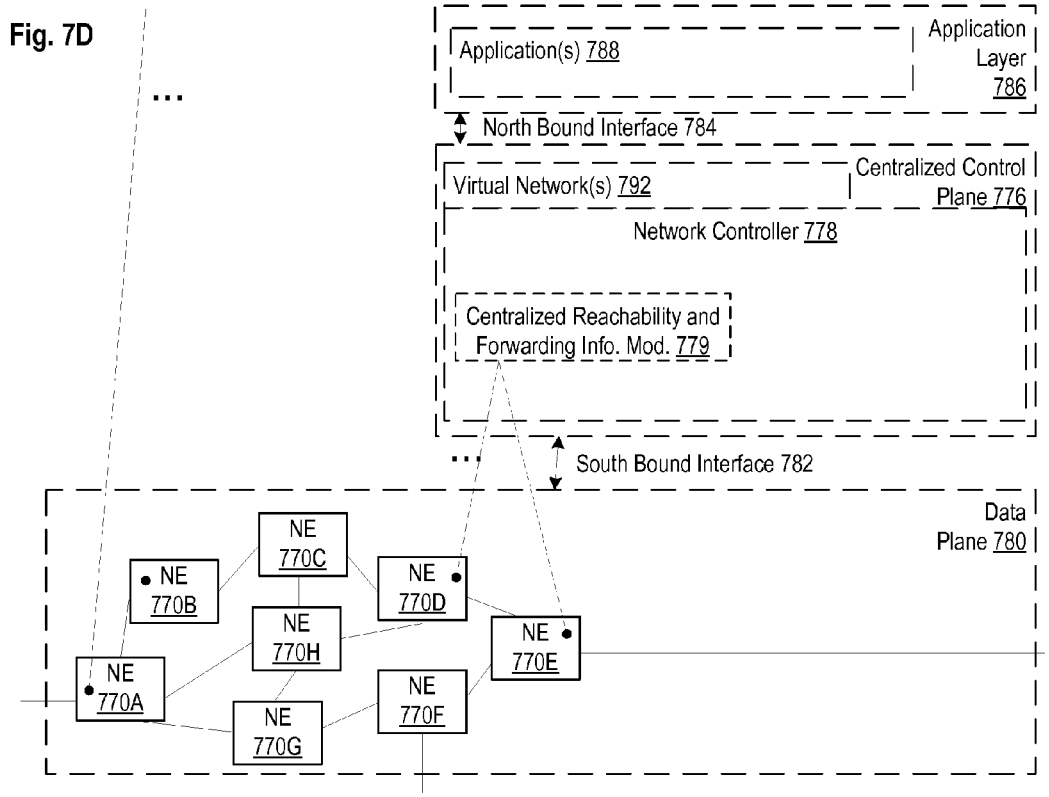
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches. In addition, the centralized approach 774 can be implemented with the special purpose network device 702 or the general purpose network device 704 implementing embodiments of the invention as described with reference to FIGS. 1-6 for enabling an adaptive load balancing in packet processing.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
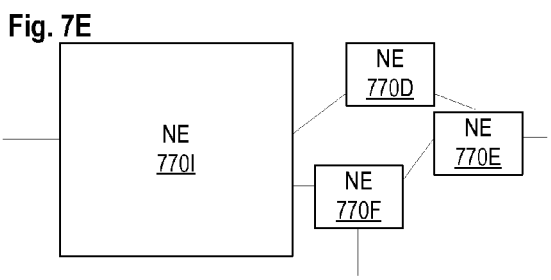
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
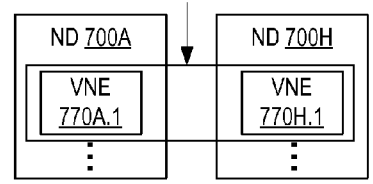
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking) For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for forwarding packets in a network device, the method comprising:
   receiving a packet;
   mapping the packet of a flow to a bucket, wherein the bucket is associated with a packet processing thread from a plurality of packet processing threads;
   determining whether the packet processing thread is oversubscribed;
   responsive to determining that the packet processing thread is not oversubscribed,
      performing the following:
         setting a load balancing flag of the packet of the flow to a first value indicating that the packet is directly mapped to the packet processing thread instead of being load balanced over one of the plurality of packet processing threads, and
         mapping the packet of the flow to the packet processing thread;
   responsive to determining that the packet processing thread is oversubscribed, performing the following:
      setting the load balancing flag of the packet of the flow to a second value indicating that the packet is load balanced over one of the plurality of packet processing threads instead of being directly mapped to the packet processing thread,
      distributing the packet to one of the plurality of packet processing threads based on a predefined load balancing scheme, and
      processing the packet of the flow in the one of the plurality of packet processing threads; and
   forwarding the packet according to a predetermined order, wherein the predetermined order is based on a position of the packet relative to other packets of the flow at their receipt in the network device, wherein the packet of the flow is received after a preceding packet of the flow at the network device, and forwarding the packet of the flow further includes:
      responsive to determining that the packet of the flow has a load balancing flag set to the first value, outputting the packet of the flow, and
      responsive to determining that the packet of the flow has a load balancing flag set to the second value, performing the following:
         determining whether the preceding packet of the flow is still to be processed by one of the plurality of packet processing threads,
         responsive to determining that the preceding packet of the flow is still to be processed, storing the packet in a buffer, and
         outputting the packet of the flow following the processing and output of the preceding packet of the flow.

2. The method of claim 1, wherein responsive to determining that the packet processing thread is oversubscribed, further evaluating a state of the bucket, wherein the state of the bucket is indicative of a packet rate.

3. The method of claim 2, wherein distributing the packet is further based on the evaluated state of the bucket.

4. The method of claim 2, wherein the state of the bucket includes one or a combination of:
   a counter value for the bucket, wherein the counter value is indicative of the number of packets in the bucket; and
   an exponential weighted moving average (EWMA) value of the packet rate for the bucket.

5. The method of claim 1, further comprising:
   assigning a sequence number to the packet prior to distributing the packet to one of the plurality of packet processing threads, and
   wherein forwarding the packet is performed according to the assigned sequence number.

6. The method of claim 1, wherein determining whether the packet processing thread is oversubscribed includes:
   evaluating a length of a queue of the packet processing thread; and
   determining whether the length of the queue is above a predefined threshold.

7. The method of claim 6, wherein the length of the queue is an exponential weighted moving average (EWMA) queue length.

8. The method of claim 1, wherein mapping the packet to the bucket is performed according to a hashing function.

9. A non-transitory machine-readable storage medium that provides instructions, which when executed by a processor of a network device, cause said processor to perform operations comprising:
   receiving a packet;
   mapping the packet of a flow to a bucket, wherein the bucket is associated with a packet processing thread from a plurality of packet processing threads;

determining whether the packet processing thread is oversubscribed;
responsive to determining that the packet processing thread is not oversubscribed,
performing the following:
setting a load balancing flag of the packet of the flow to a first value indicating that the packet is directly mapped to the packet processing thread instead of being load balanced over one of the plurality of packet processing threads, and
mapping the packet of the flow to the packet processing thread;
responsive to determining that the packet processing thread is oversubscribed,
performing the following:
setting the load balancing flag of the packet of the flow to a second value indicating that the packet is load balanced over one of the plurality of packet processing threads instead of being directly mapped to the packet processing thread,
distributing the packet to one of the plurality of packet processing threads based on a predefined load balancing scheme, and
processing the packet of the flow in the one of the plurality of packet processing threads; and
forwarding the packet according to a predetermined order, wherein the predetermined order is based on a position of the packet relative to other packets of the flow at their receipt in the network device, wherein the packet of the flow is received after a preceding packet of the flow at the network device, and forwarding the packet of the flow further includes:
responsive to determining that the packet of the flow has a load balancing flag set to the first value, outputting the packet of the flow, and
responsive to determining that the packet of the flow has a load balancing flag set to the second value, performing the following:
determining whether the preceding packet of the flow is still to be processed by one of the plurality of packet processing threads,
responsive to determining that the preceding packet of the flow is still to be processed, storing the packet in a buffer, and
outputting the packet of the flow following the processing and output of the preceding packet of the flow.

10. The non-transitory machine-readable storage medium of claim 9, wherein responsive to determining that the packet processing thread is oversubscribed, further evaluating a state of the bucket, wherein the state of the bucket is indicative of a packet rate.

11. The non-transitory machine-readable storage medium of claim 10, wherein distributing the packet is further based on the evaluated state of the bucket.

12. The non-transitory machine-readable storage medium of claim 10, wherein the state of the bucket includes one or a combination of:
a counter value for the bucket, wherein the counter value is indicative of the number of packets in the bucket; and
an exponential weighted moving average (EWMA) value of the packet rate for the bucket.

13. The non-transitory machine-readable storage medium of claim 9, wherein the operations further comprise:
assigning a sequence number to the packet prior to distributing the packet to one of the plurality of packet processing threads, and
wherein forwarding the packet is performed according to the assigned sequence number.

14. The non-transitory machine-readable storage medium of claim 9, wherein determining whether the packet processing thread is oversubscribed includes:
evaluating a length of a queue of the packet processing thread; and
determining whether the length of the queue is above a predefined threshold.

15. The non-transitory machine-readable storage medium of claim 14, wherein the length of the queue is an exponential weighted moving average (EWMA) queue length.

16. The non-transitory machine-readable storage medium of claim 9, wherein mapping the packet to the bucket is performed according to a hashing function.

* * * * *